United States Patent
Koepper et al.

[11] Patent Number: 5,805,690
[45] Date of Patent: Sep. 8, 1998

[54] METHOD OF DISTRIBUTED CALL CONTROL IN A DISTRIBUTED TRANSIT PBX SYSTEM

[75] Inventors: Richard Koepper, Tomkins Cove, N.Y.; Adoor V. Balasubramanian, Wayne, N.J.

[73] Assignee: Timeplex, Inc., Woodcliff Lake, N.J.

[21] Appl. No.: 726,633

[22] Filed: Oct. 7, 1996

[51] Int. Cl.[6] .............................. H04M 7/00; H04M 3/00; H04L 12/28

[52] U.S. Cl. ...................... 379/220; 379/220; 379/219; 379/221; 379/225; 379/269; 370/396

[58] Field of Search .................................. 379/219, 220, 379/221, 225, 269; 370/357, 359, 388, 396, 524

[56] References Cited

U.S. PATENT DOCUMENTS

| | | | |
|---|---|---|---|
| 4,317,962 | 3/1982 | Cox et al. ................................. | 179/18 |
| 4,719,952 | 1/1988 | Kobayashi .............................. | 379/269 |
| 4,720,854 | 1/1988 | sand ....................................... | 379/269 |
| 4,896,350 | 1/1990 | Bicknell et al. ........................ | 379/220 |
| 4,924,500 | 5/1990 | lewis et al. ............................. | 379/201 |
| 5,042,064 | 8/1991 | Chung et al. .......................... | 379/113 |
| 5,119,415 | 6/1992 | Aoyama ................................. | 379/207 |
| 5,212,691 | 5/1993 | Hokari .................................... | 370/384 |
| 5,255,264 | 10/1993 | Cotton et al. ........................... | 370/24 |
| 5,317,633 | 5/1994 | Hiraiwa .................................. | 379/230 |
| 5,375,167 | 12/1994 | Bales et al. ............................. | 379/219 |
| 5,422,943 | 6/1995 | Cooney et al. ......................... | 379/225 |
| 5,446,732 | 8/1995 | Miyamoto .............................. | 370/384 |
| 5,450,482 | 9/1995 | Chen et al. ............................. | 379/207 |
| 5,487,110 | 1/1996 | Bray ....................................... | 379/220 |
| 5,555,298 | 9/1996 | Jonsson ................................. | 379/219 |

FOREIGN PATENT DOCUMENTS 0556515  12/1992  European Pat. Off. .

*Primary Examiner*—Daniel S. Hunter
*Assistant Examiner*—Benny Q. Tieli
*Attorney, Agent, or Firm*—Irwin Ostroff; Erwin W. Pfeifle

[57] ABSTRACT

A method of Distributed Call Control is provided in a Distributed Transit Private Branch Exchange (PBX) comprising a plurality of Nodes forming a wide area network, and a plurality of D-channel Server Modules (DSMs). The DSMs are located in predetermined ones of the Nodes with each DSM coupled to at least one associated PBX via at least one D channel. The method includes the following steps. First, a listing of all Exchange Codes (ECs) handled by a DSM and each associated PBX coupled thereto is stored in a local routing table of a memory in the DSM. Second, a listing of all ECs handled by all of the other DSMs of the Distributed Transit PBX and their associated PBXs is stored in a remote routing table of the memory in each of the DSMs. Third, upon receiving a call request and an Exchange Code (EC) for a called PBX at a DSM from an associated calling PBX, determining at the DSM if the EC is found on the local routing table, and routing call back to the associated called PBX when a the EC is found on the local routing table. Fourth, determining if the received EC is found on the remote routing table for a remote DSM when the EC is not found on the local routing table. When the EC is found in the remote routing table, the call is routed to a remote DSM which routes the call to the called PBX.

21 Claims, 4 Drawing Sheets

1

METHOD OF DISTRIBUTED CALL CONTROL IN A DISTRIBUTED TRANSIT PBX SYSTEM

CROSS REFERENCE TO RELATED APPLICATIONS

This invention is related to U.S. patent application Ser. No. 08/726,579 (TX14) entitled "Distributed Transit Private Branch Exchange", which is being filed concurrently with this application and which has common inventorship and a common assignee.

FIELD OF THE INVENTION

The present invention relates to a technique for providing Distributed Call Control across a Wide Area network that creates the concept of a distributed Transit PBX.

BACKGROUND OF THE INVENTION

Private Branch Exchanges (PBXs) are typically used by corporations to provide voice/data (Voice/Facsimile/Modem/Data) between various facilities within a corporation. Referring now to FIG. 1, there is shown a network 10 comprising a plurality of PBXs 12, 14, and 16 which are interconnected with a predetermined number of lines 17, 18, and 19 as is found in the prior art. More particularly, PBX 12 is interconnected to PBX 14 and PBX 16 via communication lines 17 and 18, respectively, while PBX 14 is interconnected to PBX 16 via the line 19. Therefore, each PBX 12, 14, and 16 can directly communicate with any of the other PBXs in the network. If two PBXs need to communicate, then a separate connection between the PBXs is required. This configuration becomes increasingly more inefficient as the number of PBXs increases because the number of leased lines required becomes excessive in order to keep connectivity between the PBXs.

Referring now to FIG. 2, there is shown a network 20 found in the prior art which reduces the number of leased communication lines needed in a large network and illustrates the known concept of a "Transit PBX". The network 20 comprises a plurality of remote PBXs 22, 24, and 26, and a remote Transit PBX 28 that is interconnected to the remote PBXs 22, 24, and 26 via separate leased communication lines 25, 27, and 29, respectively. For example, the PBXs 22, 24, and 26 could be located in Los Angles, New York, and Dallas, respectively, with the Transit PBX 28 located in Chicago. All call control between the PBXs 22, 24, and 26 is performed within the single box of the Transit PBX 28.

Referring now to FIG. 3, there is shown a prior art network 20a which includes four Transit PBXs similar to the Transit PBX 28 of FIG. 2 that are interconnected. The network 20a comprises a plurality of Transit PBXs of which four Transit PBXs 28a, 28b, 28c, and 28d are shown. The Transit PBX 28a is interconnected to a remote PBX 22a via a leased communication lines 25a, and is interconnected to the Transit PBX 28b via a links 23a. The Transit PBX 28b is also interconnected to Transit PBXs 28c and 28d via separate leased communication lines 23b and 23c, respectively. The Transit PBX 28c is interconnected to PBXs 22b and 22c via separate leased communication lines 25b and 25c, respectively. The Transit PBX 28d is interconnected to PBX 22d via a leased communication lines 25d. All call control between the PBXs 22a, 22b, 22c, and 22d is performed within the single box of each of the Transit PBX 28a, 28c, or 28d interconnected to the associated PBXS. Still further, each of the Transit PBXs 28a, 28b, and 28c need to be manually updated to include any changed route information occurring in each of the other Transit PBXS.

U.S. Pat. Ser. No. 4,317,962 (Cox et al.), issued on Mar. 2, 1982, discloses a solid state modular distributed control for a digitally switched local or central office that services an expandable number of subscribers in which subscriber lines and trunks communicate through a standardized hardware interface to a group switch. The system provides microprocessor control of each call, with software distributed in accordance with the class of service per line, without the limitations of centralized control systems, but expandable without adverse affect on existing software. Switching control signals are communicated to and from the subscriber subsets to the group switch over the same paths which couple speech signals thereto. Still further, subscriber calls are divided into originating and terminating call halves under subscriber control, and separated by the group switch.

U.S. Pat. Ser. No. 4,720,854 (Sand), issued on Jan. 19, 1988, discloses a distributed processing telecommunication switching system comprising a plurality of switching modules. The individual switching modules control substantially all telephone call control processing actions, including the selection of an available port of a multiport hunt group, without requiring the assistance of a central processor. Each switching module includes a processor, a plurality of ports connected to customer lines and interoffice trunks, a plurality of outlets for setting up intermodule connections, and a switching network for interconnecting ports and outlets within a module. The module processors communicate with each other by a high speed common data communication facility connected to all processors. This data communication facility is used for communicating intermodule call control messages and port availability data to allow port hunts to be accomplished without using a central processor.

U.S. Pat. Ser. No. 5,255,264 (Cotton et al.), issued on Oct. 19, 1993, discloses a communication switching system with distributed control processing. The system includes a digital switching network having a modular array of intelligent digital switching elements, where each switching element has a processor and a memory to set up communication paths for voice and data between terminal module processors such as line cards and telephone units. Each addressable location in the system is assigned a logical address code (LAC). When a route is requested, a switch element processor interprets the destination LAC and selects a route through the switch toward the destination, where each switch element in the communication path sets a route toward that destination. The switching network provides duplex paths for flexible communication. With such duplex path, speech is directed from a first terminal unit, such as a telephone station, and a second terminal unit, such as a line card, into a bridge port which sums the speech data from the two terminal units. The summed speech is then sent from the bridge port to the terminal units.

It is desirable to provide a method of distributed call control which is performed at various nodes across a wide area network instead of within a single PBX or node.

SUMMARY OF THE INVENTION

The present invention is directed to a technique for providing Distributed Call Control across a Wide Area network that helps implement a Distributed Transit PBX.

Viewed from one aspect, the present invention is directed to a method of providing Distributed Call Control in a Distributed Transit Private Branch Exchange (PBX) comprising a plurality of N nodes located remotely from each other and forming a wide area network, and a plurality of X D-channel Server Modules (DSMs) located in predetermined ones of the plurality of N nodes. Each node is coupled to predetermined ones of the other nodes via separate links so that each node is able to communicate with all other nodes. Each DSM coupled is to at least one associated PBX via at least one D channel. The method comprises the following steps. In a first step, a call establishment request comprising an Exchange Code (EC) is received for a destination PBX via a D channel of an associated PBX interface. In a second step, a determination is made at the DSM if the EC received in the first step is serviced by any of the PBXs coupled to the same DSM, and routing the call to the associated called PBX. In a third step, a determination is made in the DSM if the EC received in the first step is handled by a remote DSM when the EC is not serviced by and PBX coupled to the same DSM, and the call is routed to the remote DSM. In a fourth step, a finding is made of the PBX interface associated with the EC in the remote DSM, and the call is routed to that PBX to complete the call.

Viewed from another aspect, the present invention is directed to a method of providing Distributed Call Control in a Distributed Transit Private Branch Exchange (PBX) comprising a plurality of N nodes located remotely from each other and forming a wide area network, and a plurality of X D-channel Server Modules (DSMs) located in predetermined ones of the plurality of N nodes. Each node is coupled to predetermined ones of the other nodes via separate links so that each node is able to communicate with all other nodes. Each DSM coupled is to at least one associated PBX via at least one D channel. The method comprises the following steps. In a first step, a listing of all Exchange Codes (ECs) handled by a DSM and each associated PBX coupled thereto is stored in a local routing table of a memory in the DSM. In a second step, a listing of all ECs handled by all of the other DSMs of the Distributed Transit PBX and their associated PBXs is stored in a remote routing table of the memory in each of the DSMS. In a third step, receiving a call establishment request comprising an Exchange Code (EC) for a destination called PBX is received at a DSM from an associated calling PBX. In a fourth step, a determination is made at the DSM if the EC received in the third step is found on the local routing table, and the call is routed to the associated called PBX when the EC is found on the local routing table indicating that the calling and called PBXs are handled by the same DSM. In a fifth step, a determination is made in the DSM if the EC received in the third step is found on the remote routing table and handled by a remote DSM and its associated destination called PBX when the EC is not found on the local routing table in the fourth step, and the call is routed to the remote DSM when the call is addressed to a PBX that is not coupled to the same DSM. In a sixth step, in the remote DSM, a finding is made of a PBX interface associated with the EC and the call is routed to the called PBX.

The invention will be better understood from the following more detailed description taken with the accompanying drawings and claims.

DETAILED DESCRIPTION

Figure 4:
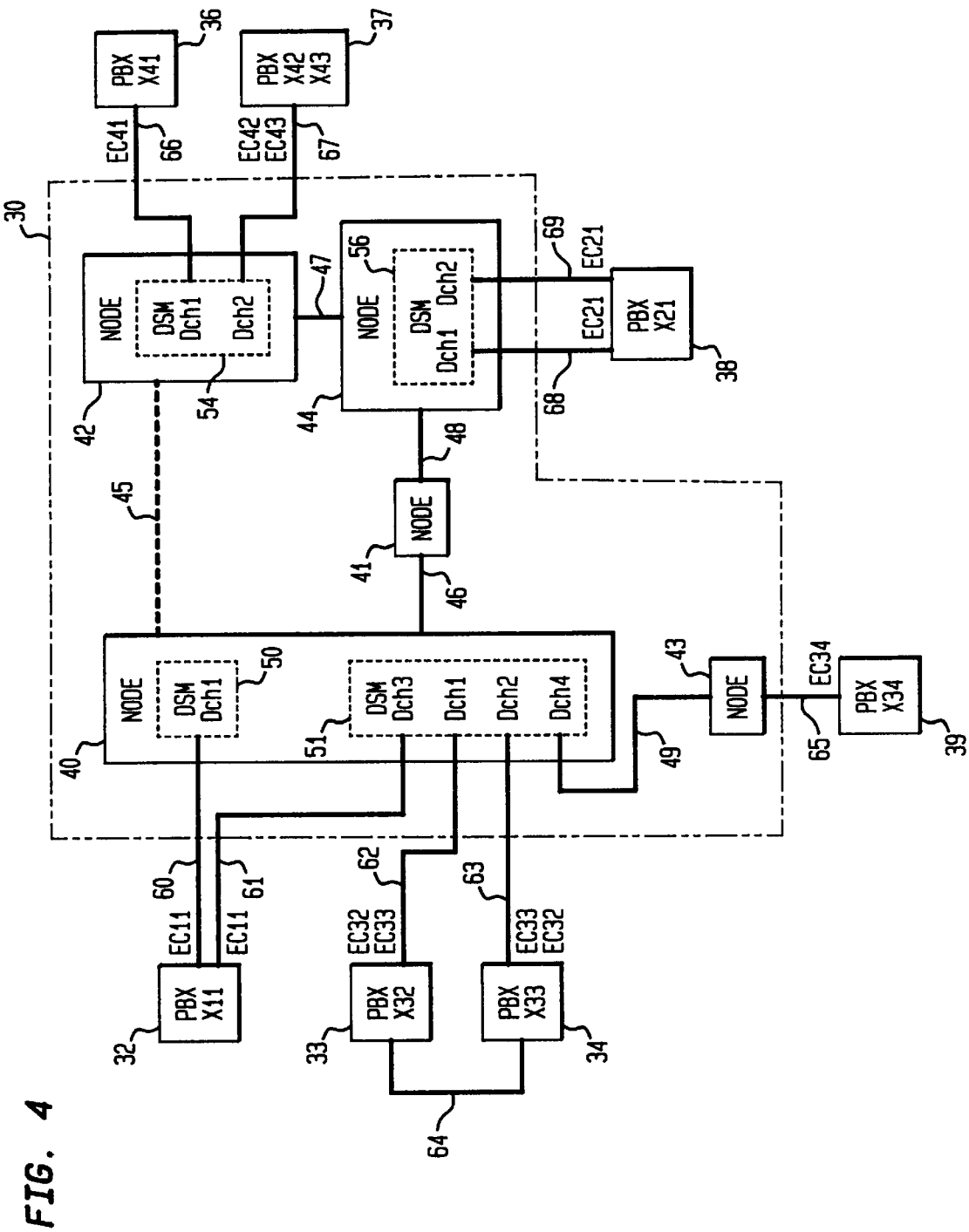
FIG. 4 is a block diagram of a network comprising a plurality of Private Branch Exchanges (PBXs) and local nodes interconnected to form a single Distributed Transit PBX in accordance with the present invention.

Referring now to FIG. 4, there is shown a block diagram of a Distributed Transit PBX 30 (shown within a dashed line block) in accordance with the present invention. The Distributed Transit PBX 30 comprises a plurality of N interconnected Nodes 40, 41, 42, 43, and 44 which permit a plurality of M Private Branch Exchanges (PBXS) 32, 33, 34, 36, 37, 38, and 39 that are connected to the Distributed Transit PBX 30 to communicate over a wide area network. There are illustrated seven PBXs as the M PBXs, where M can be less than, equal to, or greater than seven. Still further, there are illustrated five Nodes as the N Nodes, where N can be less than, equal to, or greater than five, and the M PBXs can be less than, equal to, or greater than the number of N Nodes.

The PBX 32 (PBX X11) is coupled to a D channel 1 (Dch1) of a D-Channel Server Module (DSM) 50 in the Node 40 via a link 60, and to a D channel 3 of a DSM 51 in the Node 40 via a link 61. The PBX 33 (PBX X32) and the PBX 34 (PBX X33) are coupled to a D channel 1 (Dch1) and a D channel 2 (Dch2), respectively, in the DSM 51 in the Node 40 via respective links 62 and 63. The PBX 39 (PBX X34) is coupled to a D channel 4 (Dch4) in the DSM 51 via a link 65, the Node 43, and a link 49. The PBX 36 (PBX X41) and the PBX 37 (PBX X42 X43) are coupled to a D channel 1 (Dch1) and a D channel 2 (Dch2), respectively, in a DSM 54 in the Node 42 via respective links 66 and 67. The PBX 38 (PBX X21) is coupled to a D channel 1 (Dch1) and a D channel 2 (Dch2) of a DSM 56 in the Node 44 via links 68 and 69, respectively. Each of the Nodes 40, 41, 42, 43, and 44 has X DSMs, where X≧0. The Nodes 40, 41, 42, 43, and 44 are remote to each other and are located local to the associated PBXs 32, 33, 34, 36, 37, 38, and 39. For example, the PBXs 32, 33, and 34 and the Node 40 can be located local to each other in Los Angeles, the PBXs 36 and 37 and the Node 42 can be located local to each other in New York City, the PBX 38 and the Node 44 can be located local to each other in Dallas, and the PBX 39 and the Node 43 can be located local to each other in San Diego but connected to Node 40 via the link 49. This permits local lines (e.g., lines 60, 62, and 63) to be used between the associated PBXs (e.g., PBXs 32, 33, and 34) and the Node (e.g., 40) which can be obtained from a local communication system. The Node 40 is shown coupled to the Node 42 via an interconnection 45 (shown as a dashed line) and to the Node 44 via an interconnection 46, the Node 41, and an interconnection 48, while the Nodes 42 and 44 are shown coupled together via an interconnection 47. It is to be understood that all of the interconnections 45, 46, 47, and 48 are not required as long as each of the Nodes 40, 42, and 44 can communicate with each of the other Nodes directly or via and intermediate Node. For example, interconnection 45 can be eliminated because the Node 40 can communicate with the Node 42 via the interconnection 46, the Node 41, the interconnection 48, the Node 44 and the interconnection 47. Still further, it is to be understood that the interconnections 45, 46, 47, 48, and 49 can be obtained via a private or a local and/or long distance public communication system (e.g., leased lines).

Each of the PBXs 32, 33, 34, 36, 37, 38, and 39 support predetermined signaling protocols such as, for example, the British Telecom's devised Digital Private Network Signaling System No. 1 (DPNSS) signaling protocol standard, or QSIG which is the European Telecommunications Standards Institute's devised signaling protocol standard. Each of the PBXs 32, 33, 34, 36, 37, 38, and 39 (via Node 43) are connected to the associated Nodes 40, 42, or 44 via a separate port (not shown) on, for example, an E1 or T1 module (not shown) in the associated Node 40, 42, or 44 using a Common Channel Signaling (CCS) signaling protocol. Such signaling protocols use an entire 64 kbit/sec time slot on an E1 or T1 facility connecting the PBX 32, 33, 34, 36, 37, 38, and 39 to the associated Node 40, 42, or 44, and the signaling time slot is referred to as a D channel message. It is to be understood that a predetermined kbit/sec time slot can be used other than the 64 kbit/sec time slot mentioned hereinabove when using other facilities. The remaining time slots are B channels and are available for user data. PBXs 32, 33, 34, 36, 37, 38, and 39 that use CCS operate with specific Layer 2 and Layer 3 signaling protocols on a CCS channel. Since the CCS PBXs (e.g., PBX 32) are connected to their associated local node (e.g., Node 40), if the Node could decode call state information in the CCS channel, then the Node could provide Voice Compression with Bandwidth Contention between the PBXs 32, 33, 34, 36, 37, 38, and 39. To solve this problem, the DSMs 50, 51, 54, and 56 are arranged to decode the Layer 2 and Layer 3 CCS protocol signaling messages and provide correct type of voice/data circuits for a call. Still further, because the CCS protocol is fully decoded in a DSM (e.g., DSM 50), the telephone numbers being called are known in the DSM such that a call can be switched to an appropriate destination as will be described hereinafter.

Figure 2:
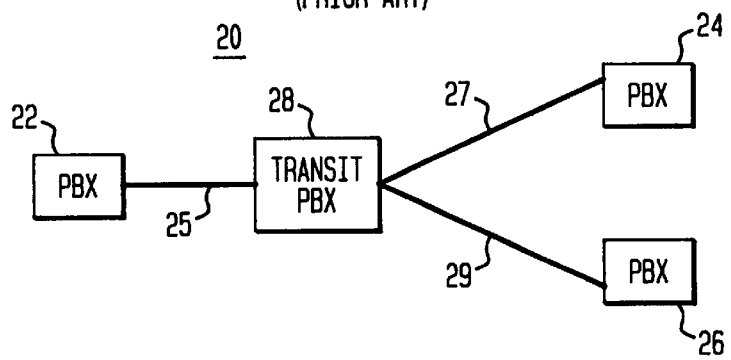
FIG. 2 is a block diagram of a network comprising a plurality of Private Branch Exchanges (PBXs) interconnected in accordance with a prior art arrangement that illustrates the concept of a Transit PBX.

The Nodes 40, 42, and 44 each comprise at least one D-Channel Server Module (DSM) 50, 51, 54, or 56 which are used to provide distributed call control between nodes 40, 42, and 44 across the Distributed Transit PBX 30. The DSMs 50, 51, 54, and 56 use the D channel messages to establish calls, disconnect calls, and support supplementary services. More particularly, the DSMs 50, 51, 54, and 56 enable the network of Nodes 40, 41, 42, 43, and 44 to emulate a Transit PBX network as shown in FIG. 2 to terminate protocols, relay information across the network of Nodes 40, 41, 42, 43, and 44, and regenerate appropriate messages at a far side of the node network. Call set-up and disconnect messages are also interpreted by each of the DSMs 50, 51, 54, and 56 to connect/disconnect connections between the requested B channels at the PBXs 32, 33, 34, 36, 37, 38, and 39. Each of the DSMs 50, 51, 54, and 56 is capable of serving up to a maximum of, for example, sixteen PBXS. For example, DSM 51 in Node 40 is shown as serving three separate PBXs (33, 34, and 39) via separate D channels (Dch1, Dch2, Dch3, and Dch4) of the exemplary sixteen possible channels.

Figure 5:
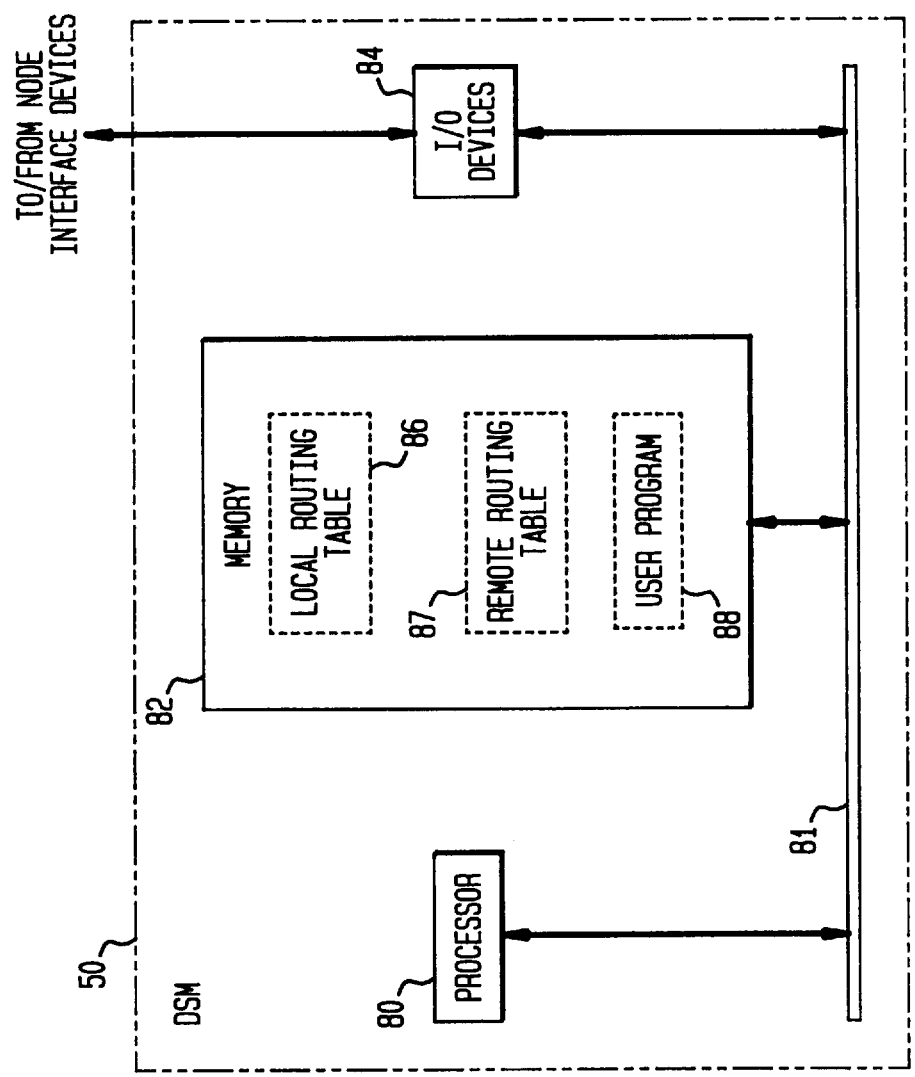
FIG. 5 is block diagram of a D-Channel Server Module forming part of each node of the Distributed Transit PBX of FIG. 4 in accordance with the present invention.

Referring now to FIG. 5, there is shown a block diagram of the D-Channel Server Module (DSM) 50 forming part of the Node 40 of the Distributed Transit PBX 30 of FIG. 4 in accordance with the present invention. It is to be understood that each of the other DSMs 51, 54, and 56 of the Nodes 40, 42, and 44, respectively, have a corresponding arrangements. The DSM 50 comprises a processor 80, a memory 82, and Input/Output Devices (I/O Devices) 84, with each coupled to a bus 81 for providing Distributed Call Control within the Distributed Transit PBX 30 of FIG. 4. The Memory 82 comprises separate memory sections associated with a Local Routing Table 86 (shown within a dashed line rectangle), a Remote Routing Table 87 (shown within a dashed line rectangle), and a User Program 88 (shown within a dashed line rectangle). The Processor 80 can comprise any suitable processor such as, for example, a microprocessor that executes the User Program 88 using the data stored in the Local Routing Table 86, the Remote Routing Table 87, and data provided by any Node Interface Device (not shown) and received by the I/O Devices 84 and transmitted via the bus 81 to the Processor 80. Information derived by the Processor 80 in the DSM 50 to enable Distributed Call Control within the associated Node 40 and the Distributed Transit PBX 30 is transmitted to the I/O Devices 84 for distribution by one or more of the selected Node Interface Devices.

Referring now to the combination of FIGS. 4 and 5, each of the Interface Devices (not shown) in the nodes 40, 42, and 44 for the PBXs 32, 33, 34, 36, 37,38, and 39 is associated with one or more user-configured Exchange Codes (ECs). Also shown is the range of station numbers associated with each PBX as, for example, the nomenclature X13 for PBX 32 represents stations that are addressed with a calling number that starts with 13. For example, each Interface Device (not shown) in Node 40 for the PBX 32 is associated with EC11, each Interface Device (not shown) in Node 40 for the PBX 33 is associated with EC32 and EC33, each Interface Device (not shown) in the Node 40 for the PBX 34 is associated with EC33 and EC32, each Interface Device (not shown) in the Node 40 for the PBX 39 is associated with EC34, each Interface Device (not shown) in the Node 42 for the PBX 36 is associated with EC41, each Interface Device (not shown) in the Node 42 for the PBX 37 is associated with EC42 and EC43, and each Interface Device (not shown) in the Node 44 for the PBX 38 is associated with EC21. More particularly, the PBX 33 is primarily associated with EC32, but is capable of handling EC33 calls associated with PBX 34 in the event that the Dch2 of the DSM 51 or the link 63 become temporarily or permanently disabled. In this manner the PBX 34 is able to complete calls via link 64, the PBX 33, the link 62, and the Dch1 in the DSM 51. Similarly, the, PBX 34 is primarily associated with EC33, but is capable of, handling EC32 calls associated with PBX 33 in the event that the Dch1 of the DSM 51 or the link 62 become temporarily or permanently disabled. In this manner the PBX 33 is able to complete calls via the link 64, the PBX 34, the link 63, and the Dch2 in the DSM 51. PBX 37 is shown associated with EC42 and EC43 for the exemplary purpose of indicating that the PBX 37 can handle calls of customers with different Exchange Codes. PBX 38 is associated with EC21 but is shown using two D Channels (Dch1 and Dch2) in the DSM 56 of Node 44 to illustrate a condition where a PBX handles voluminous traffic and needs more than one D channel. The PBX 32 is associated with EC11, but is being shown using two D channels which are Dch1 of DSM 50 and Dch3 of DSM 51 in Node 40.

In operation, as the PBX Interface Devices are assigned to a DSM (e.g. DSM 50), the Local Routing Table 86 (shown only in FIG. 5) is generated in the associated DSM which lists the Exchange Codes that are handled by that DSM. In addition, the association between the Exchange Codes (e.g., EC11) and the DSM (e.g., DSM 50) in the Node 40 is broadcast to all of the other DSMs (e.g., DSMs 51, 54, and 56) that are interconnected to that DSM. The collection of the remote DSMs and their supported Exchange Codes is stored in the Remote Routing Table 87 in the Memory 82 of each of the DSMs 50, 51, 54, and 56. When a DSM (e.g., DSM 50) receives a call (or connect) request from the associated PBX (e.g., PBX 32), it compares the leading digits of the called number to entries in the Local Routing Table 86 of the DSM. If a match is found, the DSM (e.g., DSM 50) terminates the call on an appropriate Interface Device of that DSM since this is a local call for that PBX. If a match is not found, the DSM (e.g., DSM 50) examines the Remote Routing Table 87 in the DSM. If a match is found, then the call request is forwarded to the DSM (the called remote DSM) corresponding to the matching entry in the Remote Routing Table 87. The remote DSM (e.g., DSM 54) looks at its own Local Routing Table 86 to find a match destination interface (e.g., towards PBX 36) with a free B channel, and makes a B channel connection between PBX 32 and PBX 36. A compression step of the voice call can be performed after a free B channel on the called PBX interface is selected and when the B channel connection is performed. Therefore, each DSM only controls calls addressed to that DSM, and when a call is not addressed to a PBX associated with that DSM, the DSM passes any call control to a destination DSM associated with a PBX to which the call is addressed. An optional configuration would be to have the Node (e.g., Node 40) compress the B channel data if it is a voice call.

Figure 1:
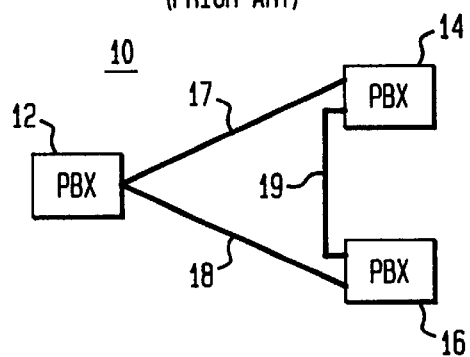
FIG. 1 is a block diagram of a network comprising a plurality of Private Branch Exchanges (PBXs) interconnected in accordance with a prior art arrangement.
Figure 3:
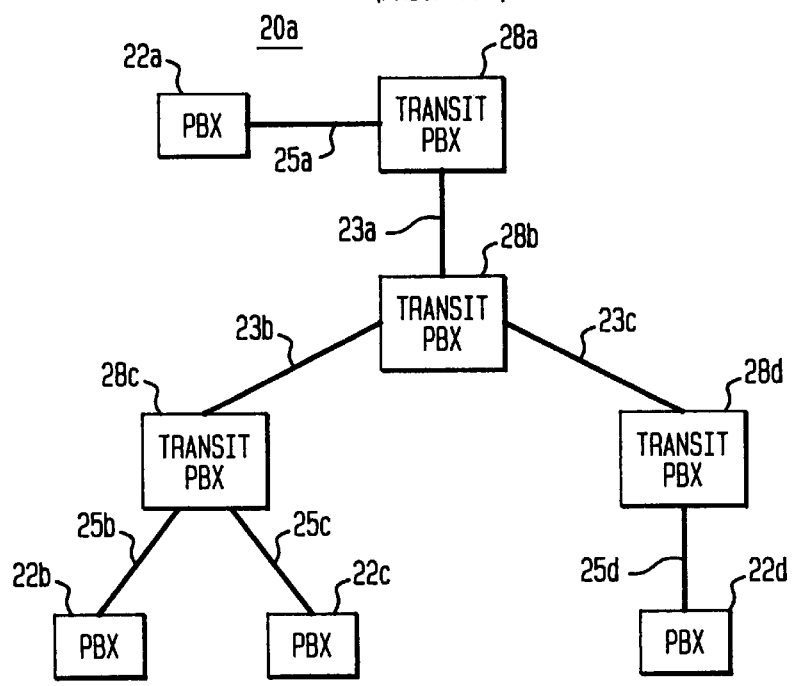
FIG. 3 is a block diagram of a network comprising a plurality of Transit Private Branch Exchanges (PBXS) and associated PBXs that are interconnected in accordance with a prior art arrangement.

The advantages obtained with the Distributed Transit PBX 30 using a network of DSMs 50, 51, 54, and 56 over that of prior art networks 10, 20, and 20a shown in FIGS. 1, 2 and 3, respectively, are as follows. First, voice compression can be used in voice communications between two PBXs, and there is no tandeming of voice compression (which would be the case if it were a collection of PBXs instead of a single distributed PBX). More particularly, in the prior art network 20a shown in FIG. 3, if a voice call is made between, for example, PBX 22a and PBX 22d and a voice path needs to be compressed along the path between PBXs 22a and 22d to save bandwidth, the voice has to be decompressed and compressed again at each of the Transit PBXs 28a, 28b, and 28d along the route. With multiple compressions and decompressions, the voice quality deteriorates. However, in accordance with the present invention, if the plurality of Transit PBXs 28a, 28b, 28c, and 28d of FIG. 3 are replaced by the single Distributed Transit PBX 30 of FIG. 4, then compression and decompression is performed only once thereby saving the bandwidth and at the same time not compromising too much of the voice quality since a compressed path can be established directly between the B channels of the calling and called PBX interfaces. The compression step is performed after a free B channel on the called PBX interface is selected and when the B channel connection is performed.

Second, call switching is possible between PBXs 32, 33, 34, 36, 37, 38, and 39 and the Remote Routing Table 87 in each DSM 50, 51, 54, and 56 provides the ability to use alternate routes between DSMS. Third, more efficient message-based signaling protocol channels between the DSMs can run at a reduced bandwidth. This advantage results from packet channels being used between DSMs instead of full 64 kilobyte/second Time Division Multiplexed (TDM) channels which would be consumed whether or not signaling is transmitted. In other words, a packet is only transmitted between DSMs when signaling data is to be sent rather than using dedicated TDM channels which will be wasted even when no signaling data is to be sent. The full 64 kilobyte/second TDM channels can be used between a PBX (e.g., PBX 32) and its associated DSM (e.g., DSM 50) for signaling purposes since such signaling is transmitted over local lines. Fourth, there is a reduction in the number of leased lines required. More particularly, the Nodes 40, 41, 42, and 44 are located local to the associated PBXs 32, 33, 34, 36, 37, 38, and 39 and do not require leased lines. The only leased lines required would be the lines 45, 46, 47, and/or 48 between the Nodes 40, 41, 42, and 44 so that all DSMs 50, 51, 54, and 56 are able to communicate with all other DSMs directly or through other DSMs in the network. For example, DSMs 50 and 51 can communicate with DSM 54 via a leased line 46, the Node 41, a leased line 48, the DSM 56, and a leased line 47, when the leased line 45 is eliminated. Fifth, the routing table broadcast mechanism results in an automatic updating of routing information in all DSMs once the information is updated in any one of the DSMs. If there were a collection of Transit PBXs 20a as shown in FIG. 3 instead of a single Distributed Transit PBX 30, the updating of route information in one Transit PBX 28a is not automatically available to the other Transit PBXs 28b, 28c, and 28d. Each of the Transit PBXs 28a, 28b, 28c, and 28d has to be manually updated.

Figure 6:
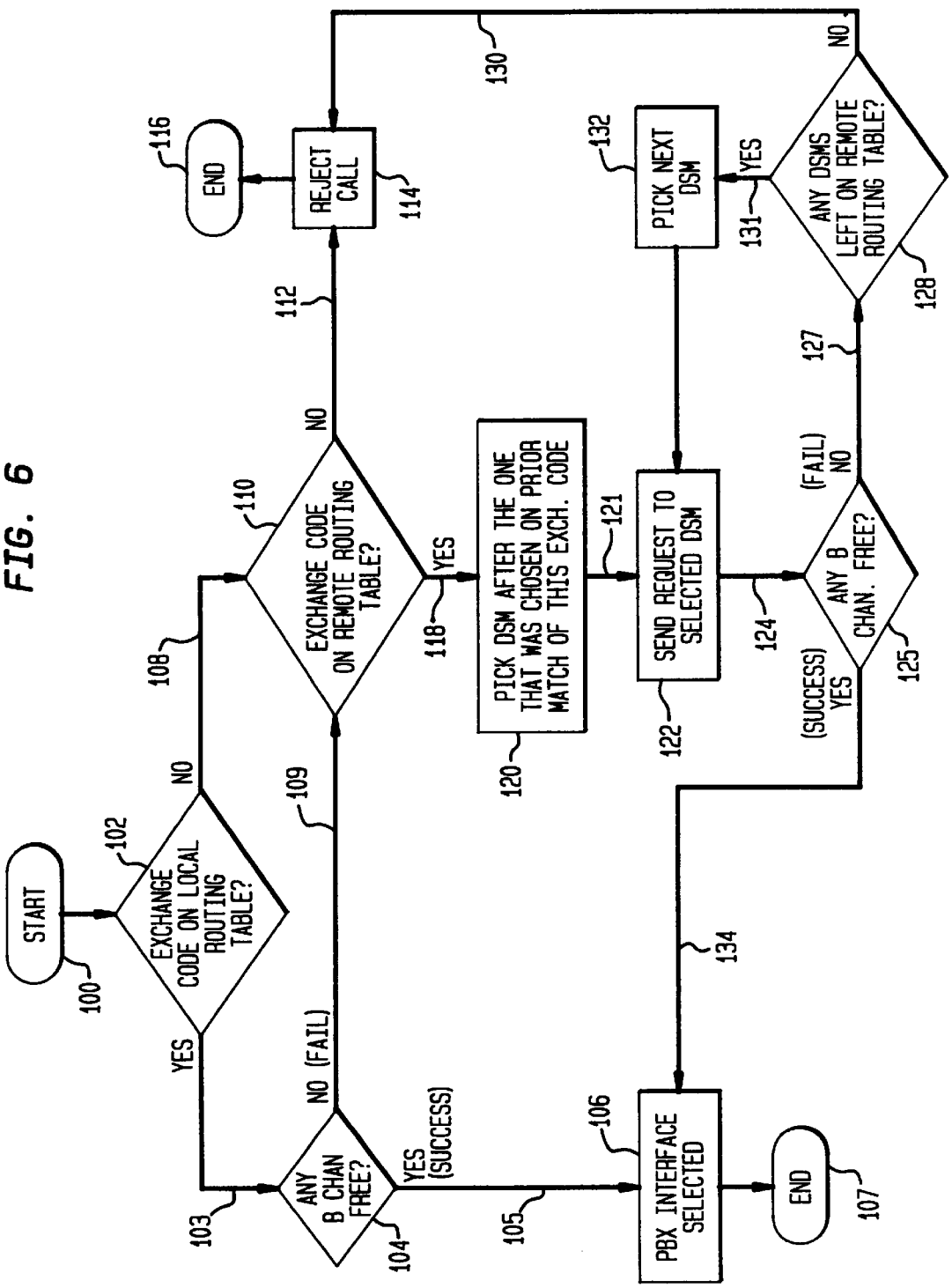
FIG. 6 is a flow diagram of distributed call control in the D-Channel Server Module of the Distributed Transit PBX of FIG. 4 in accordance with the present invention.

Referring now to FIG. 6, there is shown a flow diagram of distributed call control in the Distributed Transit PBX 30 of FIG. 4 in accordance with the present invention. For purposes of explanation, it will be assumed hereinafter that the flow diagram describes call handling of a call request from a subscriber of the PBX 32 by the DSM 50 in the Node 40 of FIGS. 4 and 5. It is to be understood that each of the other DSMs 51, 54, and 56 function in a similar manner when receiving call requests from their associated PBXs. The flow diagram corresponds to steps taken by the Processor 80 in using the User Program in the Memory section 88 of the Memory 82 (shown only in FIG. 5).

When a call request is received at the DSM 50 from the PBX 32, it is received by an Interface Device (not shown) of the Dch1 of the DSM 50 (shown in FIG. 4), and routed via the I/O devices 84 (shown only in FIG. 5) to the Processor 80. This is the starting point of the distributed call control process in the DSM 50 for a call request and corresponds to block 100 in FIG. 6. The program moves to block 102 where the Processor 80 interrogates the Local Routing Table 86 (shown only in FIG. 5) in the DSM 50 to determine if the Exchange Code forming part of the call request is listed on the Local Routing Table 86. If the Exchange Code (e.g., EC11) is found on the Local Routing Table 86, it indicates that the call is destined for another subscriber of the PBX 32. As a result, a "YES" path 103 from block 102 is taken to block 104 where a determination is made if any B channel is free to PBX 32. If a B channel to PBX 32 is found free, the "YES" path 105 directs the User Program 88 to block 106 to select an Interface Device for the PBX 32. Once the PBX Interface is selected, the calling and called subscribers are connected and the call processing sequence ends in an "END" block 107.

If the Exchange Code in the call request received in block 102 is not found when interrogating the Local Routing Table 86, the Processor 80 is directed via a "NO" path 108 to block 110 to interrogate the Remote Routing Table 87 (shown only in FIG. 5) and determine if the Exchange Code in the call request is listed in the Remote Routing Table 86. Similarly, if no free B channel is found as being available in block 104, the Processor 80 is also directed to block 110 via a "NO (FAIL)" path 109 to determine if the received Exchange Code is also found on the Remote Routing Table 87. An Exchange Code can be found on both the Local Routing Table 86 and the Remote Routing Table 87 under the condition where a PBX is connected to more than one DSM in the same or different Nodes. For example, The EC11 associated with PBX 32 will be matched in both the Local and Remote Routing Tables 86 and 87 of the DSM 40 in Node 50.

If the Exchange Code is not found on the Remote Routing Table 87, then the Processor 80 proceeds via a "NO" path 112 to block 114 and the call is determined as a rejected (REJECT) Call. Such determination causes a message to be sent to the calling PBX indicating such Non-Completed or rejected call. The Processor 80 then concludes the call request in an "END" block 116.

If the Exchange Code of the call request is found in the Remote Routing Table 87, the call proceeds from block 110 via a "YES" path 118 to block 120. In block 120 a destination DSM that will complete the call is chosen from the listing of DSMs on the Remote Routing Table 87 for the Exchange Code being processed. If more than one DSM is available for connection to a destination PBX, then the DSM after the one that was chosen in a prior match of the same Exchange Code is chosen to complete the call. Such sequential selection process provides a more uniform utilization of the hardware of the Nodes 40, 42, and 44 in the Distributed Transit PBX 30 of FIG. 4.

Once a destination DSM has been chosen in the block 120, the Processor 80 is directed via path 121 to block 122 to send a call request via a packet channel to the destination or next DSM selected in block 120. The Processor 80 then proceeds via path 124 to block 125 to determine if a free B channel is available to the chosen destination DSM. This is done by checking the response to the call request sent to the destination DSM.

If it is determined in block 125 that a free B channel is not available in the destination DSM, the Processor 80 proceeds via a "NO (FAIL)" path 127 to block 128 to determine if any other DSMs (e.g., intermediate DSMs) remain on the Remote Routing Table 87 to the destination DSM for the Exchange Code being processed. If no other DSMs are listed as remaining on the Remote Routing Table 87, the Processor 80 proceeds via a "NO" path 130 to block 114 where a Rejected call is declared and the call request is rejected with a proper message to the calling PBX in the END block 116.

If another DSM is found on the Remote Routing Table 87 in block 128, the Processor 80 proceeds via a "YES" path 131 to block 132 to choose the next DSM listed on the Remote Routing Table 87 to be used before returning to block 122. In block 122, the Processor 80 then sends a call request to the next chosen DSM via a packet channel and proceeds via path 124 to block 125 to determine if a B channel is free to the next chosen DSM. If a B channel to the destination or next chosen DSM is found free, the Processor 80 proceeds via a "YES (SUCCESS)" path 134 to block 106 indicating an Interface Device (not shown) in the next chosen DSM is selected. This ends the call request in the DSM 50 via block 107.

Once a Remote DSM handling the route is identified in block 120, a Call Setup Request is forwarded to the remote destination DSM via an inter-DSM communication channel on paths 45, 46 or 47 (shown only in FIG. 4). The Remote DSM then finds a PBX interface having a free B channel to set up the call, makes a Time Division Multiplex (TDM) connection between a source and destination B channels through the network of Nodes 40, 41, 42, and 44, and then forwards the call request to the destination PBX.

It is to be appreciated and understood that the specific embodiments of the invention described hereinabove are merely illustrative of the general principles of the invention. Various modifications may be made by those skilled in the art which are consistent with the principles set forth.

What is claimed is:

1. A method of providing Distributed Call Control in a Distributed Transit Private Branch Exchange (PBX) that serves a plurality of remotely located M PBXs comprising a plurality of N nodes located remotely from each other and forming a wide area network, with each node being coupled to predetermined ones of the other nodes via separate links so that each node is able to communicate with all other nodes, and a plurality of X D-channel Server Modules (DSMs) located in predetermined ones of the plurality of N nodes with each DSM coupled to at least one associated PBX of the plurality of remotely located M PBXs via at least one D channel, the method comprising the steps of:

(a) receiving a call establishment request comprising an Exchange Code (EC) for a destination PBX via a D channel of an associated PBX interface;

(b) determining at the DSM if the EC received in step (a) is serviced by any of the PBXs coupled to the same DSM, and routing the call to the associated called PBX;

(c) determining in the DSM if the EC received in step (a) is handled by a remote DSM when the EC is not serviced by any of the PBXs coupled to the same DSM, and routing the call to the remote DSM; and (d) finding, in the remote DSM, the PBX interface associated with the EC and routing the call to that PBX to complete the call.

2. The method of claim 1 wherein prior to performing step (a), performing the further steps of:

(a1) storing a listing of all ECs handled by a DSM and each associated PBX coupled thereto in a local routing table of a memory in the DSM for use in performing step (b); and (a2) storing a listing of all ECs handled by all of the other DSMs of the Distributed Transit PBX in a remote routing table of the memory in each of the DSMs for use in performing step (c).

3. The method of claim 2 wherein:

in performing step (b), determining by a processor if a free B channel is available on the interface to the called PBX in order to connect the call to the associated called PBX for a local call before the call is routed to the destination PBX served by the same DSM if the EC received in step (a) is found on the local routing table; and in performing step (d), determining by the processor if a free B channel is available on an interface to the called PBX and if wide area bandwidth is available between calling and called nodes in order to connect B channels on calling and called PBX interfaces.

4. The method of claim 3 wherein in step (b) performing the substeps of:

(b1) determining if the EC is found on the local routing table;

(b2) determining if a free B channel is available on an interface to the called PBX when the EC is found on the local routing table in step (b1), and moving to step (c) if the EC is not found on the local routing table in step (b1).

5. The method of claim 4 wherein in step (c) performing the substeps of:

(c1) determining if the EC is found on the remote routing table;

(c2) transmitting the call request to a remote DSM associated with the EC when the EC is found on the remote routing table in step (c1), and clearing a call when the EC is not found on the remote routing table in step (c1); and (c3) at the remote DSM, determining the PBX interface associated with the EC, finding a free B channel on that interface, connecting the calling and called B channels over the wide area network, and then forwarding the call establishment request to the associated called PBX.

6. The method of claim 5 wherein in step (c) performing the further substeps of:

(c5) determining if the remote routing table listed a secondary remote DSM in step (c1) for the EC when a free B channel is not found in step (c3);

(c6) repeating steps (c2) and (c3) for the secondary remote DSM found in step (c5), and clearing the call when a secondary remote DSM is not listed in the remote routing table.

7. The method of claim 3 wherein in performing step (d), selectively compressing a voice call between PBXs after a free B channel is selected and when a B channel connection is performed.

8. The method of claim 2 wherein in performing steps (a1) or (a2), automatically transmitting routing information stored in the local routing table, or updated thereafter, to each of the other DSM for storage in the memory of the other DSMS.

9. The method of claim 1 wherein in performing step (c), transmitting signaling communication between DSMs by using packet channels.

10. The method of claim 1 wherein in performing steps (b) and (d), communication between the DSM and the associated predetermined PBX is performed using predetermined kilobyte Time Division Multiplexing (TDM) signaling channels over associated PBX interfaces.

11. The method of claim 1 wherein in performing steps (b) and (d), each DSM is arranged to decode a layer 2 and layer 3 Common Channel Signaling (CCS) protocol signaling message on a D channel to provide a correct type of voice/data circuit for a call between calling and called PBXs.

12. A method of providing Distribute Call Control in a Distributed Transit Private Branch Exchange (PBX) that serves a plurality of remotely located M PBXs comprising a plurality of N nodes located remotely from each other and forming a wide area network, with each node being coupled to predetermined ones of the other nodes via separate links so that each node is able to communicate with all other nodes, and a plurality of X D-channel Server Modules (DSMs) located in predetermined ones of the plurality of N nodes with each DSM coupled to at least one associated PBX of the plurality of remotely located M PBXs via at least one D channel, the method comprising the steps of:

(a) storing a listing of all Exchange Codes (ECs) handled by a DSM and each associated PBX coupled thereto in a local routing table of a memory in the DSM;

(b) storing a listing of all ECs handled by all of the other DSMs of the Distributed Transit PBX and their associated PBXs in a remote routing table of the memory in each of the DSMS;

(c) receiving a call establishment request comprising an Exchange Code (EC) for a destination called PBX at a DSM from an associated calling PBX;

(d) determining at the DSM if the EC received in step (c) is found on the local routing table, and routing the call to the associated called PBX when the EC is found on the local routing table indicating that the calling and called PBXs are handled by the same DSM;

(e) determining in the DSM if the EC received in step (c) is found on the remote routing table and handled by a remote DSM and its associated destination called PBX when the EC is not found on the local routing table in step (d), and routing the call to the remote DSM when the call is addressed to a PBX that is not coupled to the same DSM; and (f) finding, in the remote DSM, a PBX interface associated with the EC and routing the call to the called PBX.

13. The method of claim 12 wherein:

in performing step (d), determining by a processor if a free B channel is available on the interface to the called PBX and making the connection between selected B channels on the calling and called PBX interfaces if the EC received in step (c) is found on the local routing table; and in performing step (f), determining by the processor if a free B channel is available on the interface to the called PBX and connecting the selected B channels on the calling and called PBX interfaces over the wide area network.

14. The method of claim 12 wherein in performing step (d), selectively compressing a voice call between PBXs after a free B channel is selected and when a B channel connection is performed.

15. The method of claim 12 wherein in performing step (e), transmitting signaling communication between DSMs by using packet channels.

16. The method of claim 12 wherein in performing steps (d) and (f), communication between the DSM and the associated predetermined PBX is performed using predetermined kilobyte Time Division Multiplexing (TDM) signaling channels over associated PBX interfaces.

17. The method of claim 12 wherein in performing steps (d) and (f), each DSM is arranged to decode a layer 2 and layer 3 Common Channel Signaling (CCS) protocol signaling message on a D channel to provide a correct type of voice/data circuit for a call between the calling and called PBXs.

18. The method of claim 12 wherein in step (d) performing the substeps of:

(d1) determining if a free B channel is available on the interface to the called PBX when the EC is found on the local routing table; (d2) determining if a free B channel is available back to the associated called PBX when the EC is found on the local routing table in step (d1), and moving to step (e) if the EC is not found on the local routing table in step (d1).

19. The method of claim 18 wherein in step (e) performing the substeps of:

(e1) determining if the EC is found on the remote routing table;

(e2) transmitting a call establishment request to a remote DSM associated with the EC when the EC is found on the remote routing table, and clearing a call when the EC is not found on the remote routing table;

(e3) determining if a free B channel is available on the interface to the called PBX, and (e4) determining if wide area bandwidth is available for connecting the selected B channels on the calling and called PBX interfaces over the wide area network.

20. The method of claim 19 wherein in step (e) performing the further substeps of:

(e5) determining if the remote routing table listed a secondary remote DSM in step (e1) for the EC when a free B channel is not found in step (e3); and (e6) repeating steps (e2) and (e3) for the secondary remote DSM found in step (e5), and terminating the call when a secondary remote DSM is not listed in the remote routing table.

21. The method of claim 12 wherein in performing steps (a) or (b), automatically transmitting routing information stored in the local routing table, or updated thereafter, to each of the other DSM for storage in the memory of the other DSMs.

* * * * *